March 31, 1931.  A. L. DANIELSON  1,798,401
COMBINATION CERTIFICATE AND LOG BOOK CONTAINER
Filed Oct. 27, 1928
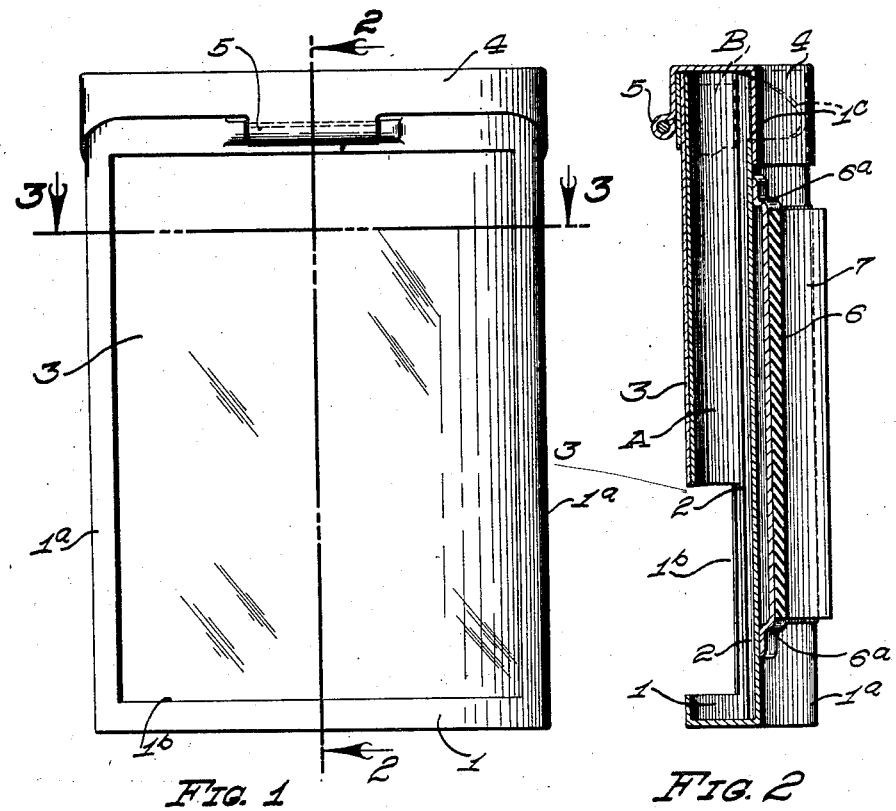
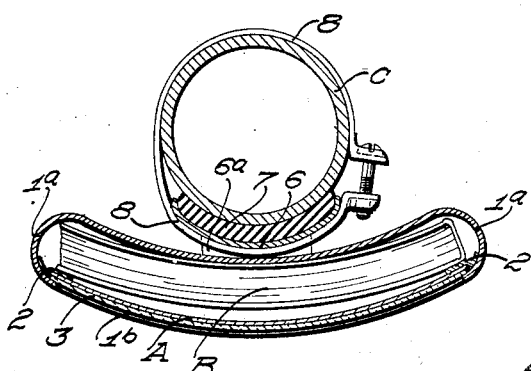
INVENTOR.
ANDREW L. DANIELSON
BY A. B. Bowman
ATTORNEY Patented Mar. 31, 1931

1,798,401

UNITED STATES PATENT OFFICE

ANDREW L. DANIELSON, OF CORONADO, CALIFORNIA

COMBINATION CERTIFICATE AND LOG-BOOK CONTAINER

Application filed October 27, 1928. Serial No. 315,433.

My invention relates to combination vehicle certificate and log-book containers and the objects of my invention are: first, to provide a device of this class whereby the automobile license or certificate and a log-book for keeping information concerning the automobile are supported in readily accessible position upon the steering post of a vehicle; second, to provide a device of this class in which the contents may be readily removed; third, to provide a device of this class which may be installed on any type of automobile steering post; fourth, to provide a device of this class which protects the vehicle certificate or license from all unnecessary wear and tear; fifth, to provide a device of this class in which the vehicle license or certificate is visible at all times; sixth, to provide a device of this class which is simple of construction and economical of manufacture; seventh, to provide a device of this class which holds the vehicle log-book in such a manner that it will not shake or rattle in the container, yet is easily removed; and eighth, to provide a device of this class which is durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application in which:

Figure 1 is an elevational view of my vehicle certificate and log-book container; Fig. 2 is a longitudinal sectional view thereof through 2—2 of Fig. 1, showing the transparent plate and license certificate broken away to facilitate the illustration, and Fig. 3 is a transverse sectional view thereof through 3—3 of Fig. 1 showing a vehicle steering post in section, showing in elevation the clamp for holding the container in position, and also showing the log-book in position within the container.

Similar characters of reference refer to similar parts and portions throughout the several views of the drawings.

The container member 1, retaining strips 2, shield member 3, cover 4, hinge 5, support member 6, pad 7, and clamp 8, constitute the principal parts and portions of my vehicle certificate and log-book container.

The container member 1 is slightly larger than the conventional automobile or vehicle certificate, indicated by A. The edge portions 1a of the container are rounded to give a smooth finish thereto. The container is curved transversely, as shown best in Fig. 3. Its forward or convex side is provided with a rectangular opening 1b slightly smaller than the conventional vehicle certificate. Positioned along each side of the cut-out portion or opening 1b is a retaining strip 2 which forms with the side edges of the cut-out portion 1b a channel or groove in which fit the lateral edges of the vehicle certificate, designated A, as shown best in Figs. 2 and 3.

The certificate is protected by the transparent shield member 3 made of suitable flexible material, such as celluloid or the like. The sides of the shield 3 fit into the channels formed by the retaining strip 2, thereby completely covering the opening 1b. In Fig. 2, the lower portions of the certificate A and the shield member 3 are broken away to illustrate better the opening 1b.

The upper or open end 1c of the container member is beveled in such a manner that the concave side of the container is considerably lower than the convex side thereof, as shown best in Fig. 2 of the drawings. A cover 4 is provided which is adapted to fit over the open end 1c of the container. The cover 4 is curved transversely to conform with the container member 1; its concave side is longer than its convex side substantially as much as the concave side of the container is shorter than the convex side thereof, thus the cover completely encloses the open end of the container yet the upper portion of the container is easily accessible.

The cover 4 is hinged to the container by a hinge member 5 positioned on the convex sides of the cover and container member, as shown in Figs. 1 and 2. In the structure shown, the hinge member is integral with the cover.

The container is adapted to receive a log-book B behind the certificate A as shown in Fig. 3. Due to the curvature of the container, the ends of the log-book press against the convex side, while the central portion presses against the concave side, thereby preventing the book from shaking or rattling in the container.

The log-book is made to completely or almost completely fill the container, thus the upper portion extends above the concave side of the container as indicated by the dotted lines in Fig. 2 of the drawings where it can be easily grasped for removal.

The container is supported on a steering post C of a vehicle by means of a support member 6. This support member consists of a strip secured at its ends 6a to the concave side of the container longitudinally therewith and spaced apart from the container intermediate its ends. The support member 6 is curved transversely so as to conform approximately with the curvature of the steering post, as shown best in Fig. 3. A pad 7 is secured to the support member or clamped between the support member and the steering post. The portion of the support member 6 which is spaced apart from the container permits a clamp member 8 to be inserted. The clamp member extends around the steering post, as shown in Fig. 3, and holds the device in position. The clamp 8 may be of any shape and size so as to enable the container to be secured to any type or size of steering post.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a combination vehicle certificate and log-book container, a rigid container member having an open upper end for holding a vehicle log-book, said container curved transversely forming concave and convex sides, said convex side having a transparent plate portion, means for securing said container at its concave side to the steering column of a vehicle, and a rigid cover for the open upper end of the container member.

2. In a combination vehicle certificate and log-book container, a container member having an open upper end for holding a vehicle log-book, said container curved transversely forming concave and convex sides, means for securing said container at its concave side to the steering column of a vehicle, said upper end being beveled so as to permit ready access to said log-book, and a cover hinged to the convex side of the container member for closing the open upper end thereof.

3. In a combination vehicle certificate and log-book container, a container member having an open upper end for holding a vehicle log-book, said container curved transversely forming concave and convex sides, means for securing said container by its concave side to the steering column of a vehicle, said upper end being beveled so as to permit ready access to said log-book, and a cover conforming to the shape of said container for closing said beveled upper end.

4. In a combination vehicle certificate and log-book container, a container member having an open upper end for holding a vehicle log-book, said container curved transversely forming concave and convex sides, means for securing said container by its concave side to the steering column of a vehicle, said container provided with an opening in the convex side thereof, and a shield supported over said opening and means for supporting a vehicle certificate behind said shield.

5. In a combination vehicle certificate and log-book container, a container member having an open upper end for holding a vehicle log-book, said container curved transversely forming concave and convex sides, means for securing said container by its concave side to the steering column of a vehicle, said upper end being beveled so as to permit ready access to said log-book, a cover conforming to the shape of said container for closing said beveled upper end, said container provided with an opening in the convex side thereof, and a shield supported over said opening and means for supporting a vehicle certificate behind said shield.

In testimony whereof, I have hereunto set my hand at San Diego, California this 19th day of October, 1928.

ANDREW L. DANIELSON.